United States Patent Office 3,284,218
Patented Nov. 8, 1966

3,284,218
HIGH ALUMINA REFRACTORIES
Donald F. King, Pittsburgh, Pa., assignor to Harbison-Walker Refractories Company, Pittsburgh, Pa., a corporation of Pennsylvania
No Drawing. Filed Jan. 14, 1965, Ser. No. 425,611
2 Claims. (Cl. 106—65)

This invention relates to phosphate bonded, high alumina refractories.

"High alumina" refractories are classified by ASTM designation C 27-60, into four classes; namely, 50% $Al_2O_3$, 60% $Al_2O_3$, 70% $Al_2O_3$ and 80% $Al_2O_3$. In the art, they are also further subdivided to include a 90% and a 99% $Al_2O_3$ group.

These refractories, containing from 50 to 90% or more of $Al_2O_3$, are made by blending various high alumina refractory materials, while those of the 99% group are made entirely of very high purity synthetic alumina, such as recovered from the Baer Process. The more common high alumina refractory materials and their calcined $Al_2O_3$ contents are the calcined alumina just mentioned, calcined South American bauxite having about 88% $Al_2O_3$, calcined Alabama bauxite having about 74% $Al_2O_3$, calcined diaspore having about 76% $Al_2O_3$, burley diaspore having about 47 to 58% $Al_2O_3$, and kyanite having about 56% $Al_2O_3$. All of these materials are chemically compatible and, accordingly, can be blended to provide almost any desired resultant alumina content. Further adjustments are sometimes accomplished by including minor amounts of clay or silica.

The foregoing high alumina refractory materials are used to make many phosphate-bonded refractories. Phosphate bonding agents include phosphoric acid and a wide range of water-soluble phosphates which yield $P_2O_5$ in aqueous solution. Such soluble compounds include various alkaline metal and alkaline earth metal salts of phosphoric acid, ammonium salts of phosphoric acid, and the like.

Phosphate bonded high alumina compositions are made into refractory brick by such processes as the extrusion process, the impact process, or on the ordinary mechanical or hydraulic brick press. They are also marketed as unconsolidated particulate (for example, monolith-forming) compositions such as mortars, ramming mixes, gunning mixes, casting mixes, and the like.

Difficulties are encountered with high alumina phosphate bonded compositions, in particular when working with the unconsolidated particulate group. Among these problems are variable strength and density in installed material. Poor storage life is another problem because of the tendency of the phosphate material to lose its bonding strength, in some unknown manner. A suggestion of one way in which to abrogate the deterioration of unconsolidated phosphate bonded materials is found in U.S. Patent 2,852,401. The invention of this patent, in which I am a co-inventor, required a specialized heat treatment.

It is thus an object of this invention to provide a phosphate-bonded, high alumina composition of more uniform density and strength in installed sites, and which has superior storage characteristics. It is not necessary to heat treat the material.

Briefly, this invention consists of adding a small and useful amount of oxalic acid to phosphate bonded, high alumina compositions. The quantity of oxalic acid added is variable, but is sufficient to retard the aging of the phosphate material in storage, and to brake or slow down, as it were, the interreaction of $Al_2O_3$ and $P_2O_5$ when mixed with aqueous tempering material, thereby assuring more uniform strength in service. Hydrated alumina is an essential part of the bonding combination. This may be a high purity synthetic hydrate, or a natural hydrate such as the gibbsite contained in most crude bauxites. The following examples are indicative of fabrication of high alumina mixes according to this invention.

Example I

A mix consisting of 98.3%, by weight, of tabular alumina (about 99+% $Al_2O_3$) and 1.7%, by weight, of hydrated alumina of technical grade purity was mixed with about 8 parts, by weight, of 75% phosphoric acid and 0.5%, by weight, of oxalic acid, the percentage quantities of acids being based on the weight of the refractory. About 2.5%, by weight, of water, based on the weight of the refractory and acids, was used to temper. Shapes were formed from a portion of the mix just mentioned by pressing 9 x 4½ x 2½" pieces on a brick press at 3000 p.s.i. The test pieces had a density after drying at 230° F. of 183 p.c.f., and a cold modulus of rupture of 3270 p.s.i. After storing of another portion of the mix for one month, shapes were made which had a density of 184 p.c.f., and the modulus of rupture was 3220 p.s.i.

Example II

A mix consisting of 98% of tabular alumina and 2% of the hydrated alumina was mixed with 7% of 75% phosphoric acid and 2% of oxalic acid, the percentage quantities of acids being based on the weight of the refractory. 1% water was used for tempering. This mix was prepared into shapes as described in Example I. The density of the shaped pieces after drying at 230° F. was 179 p.c.f.; the cold modulus of rupture was only 1310 p.s.i. Comparison of Examples I and II establishes that the quantity of oxalic acid added must be a carefully controlled and rather minor amount. According to a preferred embodiment, I added 0.5% of the oxalic acid. The total quantity should not exceed 2%; and I prefer it be maintained below 1%.

Example I sets forth the best mode now known for the practice of the present invention. The overall size grading for both Examples I and II test batches was substantially as follows: about 10% +10 mesh, about 45% −10 +65 mesh, the remainder being −65 mesh, with about 30% of the total batch being −325 mesh. Of course, sizing is variable, depending on what type of refractory is to be manufactured. With a mortar, substantially all particles will pass a 100 mesh screen, with probably 40 to 60% thereof also passing a 325 mesh screen. In commercial fabrication brick, there will perhaps be a little less on the 10 mesh screen than the exemplary sizing just noted; and the total quantity of −325 mesh material will be in the range 40–60%.

Example III

A mixture was prepared consisting of 98.5% of tabular alumina and 1.5% of aluminum hydrate. To this was added 0.44% of oxalic acid, based on the weight of the refractory, dissolved in about 7% of 75% phosphoric acid, the weight of the phosphoric acid also being based on the total weight of the refractory ingredients. 1.5% of moisture was added for tempering. Shapes were formed by air ramming. The materials were sized substantially as just mentioned. The density of the shapes after drying at 230 was 179 p.c.f. Cold modulus of rupture was 2260 p.s.i. After storing the pieces for one month, the density was found to be 182 p.c.f. After drying for two months, the density was 178 p.c.f.

Example IV

The mix of Example III was formed into brick in the same manner as discussed under Example I. Cold modulus of rupture after drying at 230° F. was 3440 p.s.i. After one month, the cold modulus of rupture was 2520 p.s.i.

The workable range of oxalic acid, as noted, is up to about 2%, based on the weight of the refractory. The range for the phosphoric acid is a quantity sufficient to provide $P_2O_5$ equivalent to that provided by about 2 to 15% of 75% phosphoric acid. As to the aluminum hydrate, a workable range is 1–10% (by weight, of the refractory) while 1–5% is preferred. This is considering a high purity (99+% $Al(OH)_3$) material. When the hydrate is supplied in the form of gibbsite, as a comparable material, it is present in an amount sufficient to provide about the same quantity of $Al(OH)_3$ as the high purity material. In fact, somewhat more. For example, 5 to 10% would be the preferred range for the gibbsite as compared to 1 to 5% for the high purity aluminum hydrate.

Having thus described the invention in detail and with sufficient particularity as to enable those skilled in the art to practice it, what is desired to have protected by Letters Patent is set forth in the following claims.

I claim:
1. A phosphate-bonded high alumina refractory composition consisting essentially of a refractory size-graded mixture of high alumina refractory material, about 1–10% of said material being $Al(OH)_3$, by weight, a phosphate-bonding ingredient sufficient to provide $P_2O_5$ equivalent to that provided by about 2–15% of 75% phosphoric acid and oxalic acid in an amount sufficient to increase storage life by retarding breakdown of the phosphate bond thereby assuring greater strength in eventual service.
2. A phosphate-bonded refractory according to claim 1 in which the oxalic acid amounts to between 0.5 and 2% based on the weight of the refractory.

References Cited by the Examiner
UNITED STATES PATENTS
2,220,411   11/1940   Kinzie et al. _____ 106—57

TOBIAS E. LEVOW, *Primary Examiner.*

J. E. POER, *Assistant Examiner.*